United States Patent
He et al.

(10) Patent No.: US 9,753,879 B2
(45) Date of Patent: Sep. 5, 2017

(54) INTERFACE SWITCHING APPARATUS FOR SWITCHING BETWEEN A PLURALITY OF POWER SUPPLY PINS AND INPUT/OUTPUT TERMINALS

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Xi-Huai He, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 304 days.

(21) Appl. No.: 14/683,650

(22) Filed: Apr. 10, 2015

(65) Prior Publication Data
US 2016/0147690 A1 May 26, 2016

(30) Foreign Application Priority Data
Nov. 20, 2014 (CN) .......................... 2014 1 0666927

(51) Int. Cl.
*G06F 13/40* (2006.01)
*G09G 5/00* (2006.01)
*G06F 1/32* (2006.01)
*G06F 13/38* (2006.01)

(52) U.S. Cl.
CPC ........ *G06F 13/4022* (2013.01); *G06F 1/3287* (2013.01); *G06F 1/3293* (2013.01); *G06F 13/387* (2013.01); *G09G 5/006* (2013.01); *G09G 2300/0426* (2013.01); *G09G 2370/12* (2013.01)

(58) Field of Classification Search
CPC .................................................. G06F 13/4022
See application file for complete search history.

(56) References Cited

U.S. PATENT DOCUMENTS

| | | | | |
|---|---|---|---|---|
| 8,959,272 | B2* | 2/2015 | Lamm | H01R 27/02 710/3 |
| 2011/0267135 | A1* | 11/2011 | Chen | G06F 1/266 327/518 |
| 2012/0246350 | A1* | 9/2012 | Lee | H02J 7/0008 710/16 |

(Continued)

*Primary Examiner* — Tammara Peyton
(74) *Attorney, Agent, or Firm* — Steven Reiss

(57) ABSTRACT

A switching apparatus to adapt an interface for multi-functional use includes a signal source, a display unit, a control unit, and a connector. The signal source includes a first power output and a data output. The display unit includes a power input and a data input. The control unit includes a switching chip having a control signal input, a first data pin, a second data pin, and a third data pin. The connector includes a second power input, a second power output, and a data output. The control signal input receives a switching signal. When the second data pin communicates with the first data pin according to the switching signal, the first power output is electrically coupled to the second power input, the signal source provides power for an electronic device connected with the connector.

19 Claims, 2 Drawing Sheets

(56) References Cited

U.S. PATENT DOCUMENTS

| | | | | |
|---|---|---|---|---|
| 2014/0118870 A1* | 5/2014 | Guo | ................ | H02H 9/046 361/56 |
| 2014/0184770 A1* | 7/2014 | King | ................ | H04N 5/23225 348/75 |
| 2014/0359193 A1* | 12/2014 | Yang | ................ | G06F 13/4022 710/316 |

\* cited by examiner

INTERFACE SWITCHING APPARATUS FOR SWITCHING BETWEEN A PLURALITY OF POWER SUPPLY PINS AND INPUT/OUTPUT TERMINALS

CROSS-REFERENCE TO RELATED APPLICATIONS

This application claims priority to Chinese Patent Application No. 201410666927.9 filed on Nov. 20, 2014, the contents of which are incorporated by reference herein in its entirety.

FIELD

The subject matter herein generally relates to switches.

BACKGROUND

High definition multimedia interfaces (HDMIs) are widely used on printed circuit boards (PCBs). Host computers communicate with monitors and other peripheral devices by way of the HDMIs. A number of input and output HDMIs are defined on the host computer to meet different requirements which increases costs.

BRIEF DESCRIPTION OF THE DRAWINGS

Implementations of the present technology will now be described, by way of example only, with reference to the attached figures.

DETAILED DESCRIPTION

Figure 1:
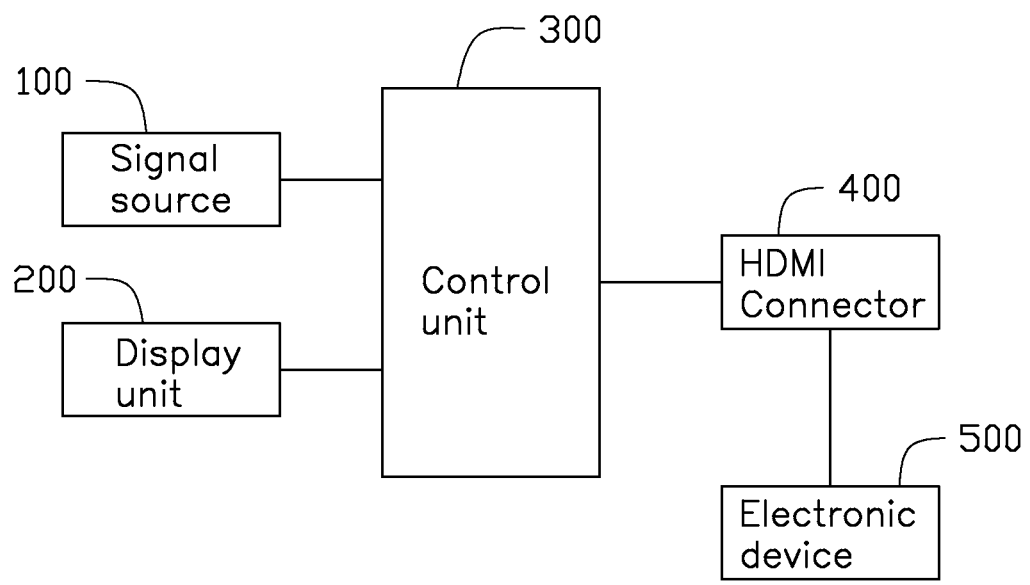
FIG. 1 is a block diagram of an embodiment of an interface switching apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like. "Unit" means a collection of electronic hardware alone or in combination with software configured for a particular task or function, although units may overlap or share components.

FIG. 1 illustrates an interface switching apparatus in accordance with one embodiment. The interface switching apparatus includes a signal source 100, a display unit 200, a control unit 300, and a high definition multimedia interface (HDMI) connector 400. The signal source 100 and the display unit 200 are electrically coupled to the HDMI connector 400 via the control unit 300. The HDMI connector 400 is configured to connect with an electronic device 500. When the electronic device 500 connected with the HDMI connector 400 is a monitor, the control unit 300 turns on the connection between the signal source 100 and the electronic device 500 and cuts off the connection between the display unit 200 and the electronic device 500. When the electronic device 500 connected with the HDMI connector 400 is a host computer, the control unit 300 turns on the connection between the display unit 200 and the electronic device 500 and cuts off the connection between the signal source 100 and the electronic device 500.

Figure 2:
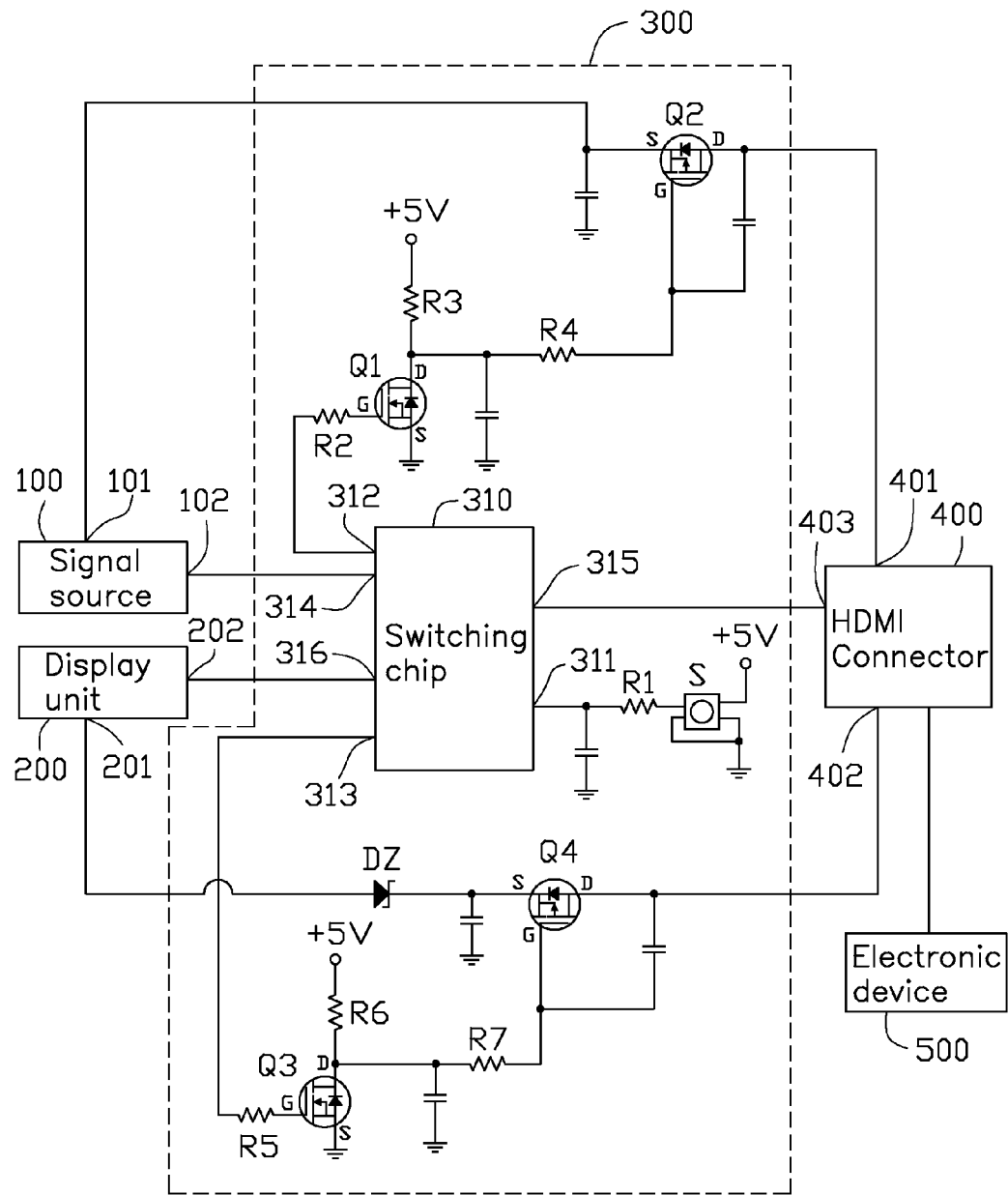
FIG. 2 is a circuit diagram of the interface switching apparatus of FIG. 1.

FIG. 2 illustrates that the signal source 100 includes a first power supply output terminal 101 and a data output terminal 102. In at least one embodiment, the signal source 100 is a host computer.

The display unit 200 includes a first power supply input terminal 201 and a data input terminal 202. In at least one embodiment, the display unit 200 is a monitor.

The control unit 300 a includes switching chip 310, a first metal-oxide-semiconductor field-effect transistor (MOSFET) Q1, a second MOSFET Q2, a third MOSFET Q3, a fourth MOSFET Q4, a push button switch S, a first resistor R1, a second resistor R2, a third resistor R3, a fourth resistor R4, a fifth resistor R5, a sixth resistor R6, a seventh resistor R7, and a zener diode DZ. The switching chip 310 includes a control signal input terminal 311, a first control signal output terminal 312, a second control signal output terminal 313, a first data pin 314, a second data pin 315, and a third data pin 316.

The HDMI connector 400 includes a second power supply input terminal 401, a second power supply output terminal 402, and a data input output terminal 403.

The push button switch S includes a first terminal, a second terminal, a third terminal, and a fourth terminal. The first terminal of the push button switch S is configured to receive a direct current (DC) voltage. The second terminal of the push button switch S is electrically coupled to the control signal input terminal 311 via the first resistor R1. The third terminal and the fourth terminal of the push button switch S are grounded. In at least one embodiment, the DC voltage is +5 volts.

The first control signal output terminal 312 is electrically coupled to a gate of the first MOSFET Q1 via the second resistor R2. A source of the first MOSFET Q1 is grounded. A drain of the first MOSFET Q1 is configured to receive the DC voltage via the third resistor R3. The drain of the first MOSFET Q1 is electrically coupled to a gate of the second MOSFET Q2 via the fourth resistor R4. A source of the second MOSFET Q2 is electrically coupled to the first power supply output terminal 101. A drain of the second MOSFET Q2 is electrically coupled to the second power supply input terminal 401. In at least one embodiment, the first MOSFET Q1 is an n-channel MOSFET. The second MOSFET Q2 is a p-channel MOSFET.

The second control signal output terminal 313 is electrically coupled to a gate of the third MOSFET Q3 via the fifth resistor R5. A source of the third MOSFET Q3 is grounded.

A drain of the third MOSFET Q3 is configured to receive the DC voltage via the sixth resistor R6. The drain of the third MOSFET Q3 is electrically coupled to a gate of the fourth MOSFET Q4 via the seventh resistor R7. A source of the fourth MOSFET Q4 is electrically coupled to an anode of the zener diode DZ. A cathode of the zener diode DZ is electrically coupled to the first power supply input terminal 201. A drain of the fourth MOSFET Q4 is electrically coupled to the second power supply output terminal 402. In at least one embodiment, the third MOSFET Q3 is an n-channel MOSFET. The fourth MOSFET Q4 is a p-channel MOSFET.

The first data pin 314 is electrically coupled to the data output terminal 102. The second data pin 315 is electrically coupled to the data input output terminal 403. The third data pin 316 is electrically coupled to the data input terminal 202.

In use, until the push button switch S is pushed, the second terminal of the push button switch S outputs a high voltage level switching signal. The second data pin 315 is switched to communicate with the first data pin 314 by the switching chip 310. The first control signal output terminal 312 outputs a high voltage level first control signal. The first MOSFET Q1 is turned on. The second MOSFET Q2 is turned on. The first power supply output terminal 101 is electrically coupled to the second power supply input terminal 401. The signal source 100 provides power for the electronic device 500 connected with the HDMI connector 400. The signal source 100 outputs data to the electronic device 500 connected with the HDMI connector 400.

When the push button switch S is pushed, the second terminal of the push button switch S outputs a low voltage level switching signal. The second data pin 315 is switched to communicate with the third data pin 316 by the switching chip 310. The second control signal output terminal 313 outputs a high voltage level second control signal. The third MOSFET Q3 turns on. The fourth MOSFET Q4 turns on. The first power supply input terminal 201 is electrically coupled to the second power supply output terminal 402. The electronic device 500 connected with the HDMI connector 400 provides power for the display unit 200. The electronic device 500 connected with the HDMI connector 400 outputs data to the display unit 200.

The embodiments shown and described above are only examples. Many details are often found in the art such as the other features of an interface switching apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An interface switching apparatus comprising:
    a signal source comprising a first power supply output terminal and a data output terminal;
    a display unit comprising a first power supply input terminal and a data input terminal;
    a control unit comprising a switching chip; the switching chip comprises a control signal input terminal, a first data pin, a second data pin, and a third data pin; and
    a connector comprising a second power supply input terminal, a second power supply output terminal, and a data input output terminal;
    wherein the first data pin is electrically coupled to the data output terminal; the second data pin is electrically coupled to the data input output terminal; the third data pin is electrically coupled to the data input terminal; the control signal input terminal is configured to receive a switching signal; the switching chip is configured to switch the second data pin communicated with the first data pin or the third data pin according to the switching signal;
    wherein when the second data pin is switched to communicate with the first data pin, the first power supply output terminal is electrically coupled to the second power supply input terminal, the signal source provides power supply for an electronic device connected with the connector; and
    wherein when the second data pin is switched to communicate with the third data pin, the first power supply input terminal is electrically coupled to the second power supply output terminal, the electronic device connected with the connector provides power supply for the display unit.

2. The interface switching apparatus of claim 1, wherein the control unit further comprises a push button switch and a first resistor; the push button switch comprises a first terminal, a second terminal, a third terminal, and a fourth terminal; the first terminal of the push button switch is configured to receive a direct current (DC) voltage; the second terminal of the push button switch is electrically coupled to the control signal input terminal; and the third terminal and the fourth terminal of the push button switch are grounded.

3. The interface switching apparatus of claim 2, wherein the control unit further comprises a first metal-oxide-semiconductor field-effect transistor (MOSFET), a second MOSFET, a second resistor, a third resistor, and a fourth resistor; the switching chip further comprises a first control signal output terminal; the first control signal output terminal is electrically coupled to a gate of the first MOSFET via the second resistor; a source of the first MOSFET is grounded; a drain of the first MOSFET is configured to receive the DC voltage via the third resistor; the drain of the first MOSFET is electrically coupled to a gate of the second MOSFET via the fourth resistor; a source of the second MOSFET is electrically coupled to the first power supply output terminal; and a drain of the second MOSFET is electrically coupled to the second power supply input terminal.

4. The interface switching apparatus of claim 3, wherein the first MOSFET is an n-channel MOSFET; and the second MOSFET is an p-channel MOSFET.

5. The interface switching apparatus of claim 3, wherein the control unit further comprises a third MOSFET, a fourth MOSFET, a fifth resistor, a sixth resistor, a seventh resistor, and a zener diode; the switching chip further comprises a second control signal output terminal; the second control signal output terminal is electrically coupled to a gate of the third MOSFET via the fifth resistor; a source of the third MOSFET is grounded; a drain of the third MOSFET is configured to receive the DC voltage via the sixth resistor; the drain of the third MOSFET is electrically coupled to a gate of the fourth MOSFET via the seventh resistor; a source of the fourth MOSFET is electrically coupled to an anode of the zener diode; a cathode of the zener diode is electrically coupled to the first power supply input terminal; and a drain of the fourth MOSFET is electrically coupled to the second power supply output terminal.

6. The interface switching apparatus of claim 5, wherein the third MOSFET is an n-channel MOSFET; and the fourth MOSFET is an p-channel MOSFET.

7. The interface switching apparatus of claim 5, wherein when the push button switch is not pushed, the second terminal of the push button switch outputs a high voltage level switching signal, the second data pin is switched to communicate with the first data pin by the switching chip, the first control signal output terminal outputs a high voltage level first control signal, the first MOSFET turns on, the second MOSFET turns on, the first power supply output terminal is electrically coupled to the second power supply input terminal, the signal source provides power supply for the electronic device connected with the connector, and the signal source outputs data to the electronic device connected with the connector.

8. The interface switching apparatus of claim 5, wherein hen the push button switch is pushed, the second terminal of the push button switch outputs a low voltage level switching signal, the second data pin is switched to communicate with the third data pin by the switching chip, the second control signal output terminal outputs a high voltage level second control signal, the third MOSFET turns on, the fourth MOSFET turns on, the first power supply input terminal is electrically coupled to the second power supply output terminal, the electronic device connected with the connector provides power supply for the display unit, and the electronic device connected with the connector outputs data to the display unit.

9. The interface switching apparatus of claim 2, wherein the DC voltage is +5 volts; the signal source is a host computer; the display unit is a monitor; and the connector is a high definition multimedia interface (HDMI) connector.

10. An interface switching apparatus comprising:
a signal source comprising a first power supply output terminal and a data output terminal;
a display unit comprising a first power supply input terminal and a data input terminal;
a control unit comprising a switching chip; the switching chip comprises a control signal input terminal, a first data pin, a second data pin, and a third data pin; and
a connector comprising a second power supply input terminal, a second power supply output terminal, and a data input output terminal;
wherein the first data pin is electrically coupled to the data output terminal; the second data pin is electrically coupled to the data input output terminal; the third data pin is electrically coupled to the data input terminal; the control signal input terminal is configured to receive a switching signal; the switching chip is configured to switch the second data pin communicated with the first data pin or the third data pin according to the switching signal;
wherein when the second data pin is switched to communicate with the first data pin according to the switching signal, the first power supply output terminal is electrically coupled to the second power supply input terminal, the signal source provides power supply for an electronic device connected with the connector, the signal source outputs data to the electronic device connected with the connector; and
wherein when the second data pin is switched to communicate with the third data pin according to the switching signal, the first power supply input terminal is electrically coupled to the second power supply output terminal, the electronic device connected with the connector provides power supply for the display unit, the electronic device connected with the connector outputs data to the display unit.

11. The interface switching apparatus of claim 10, wherein the control unit further comprises a push button switch and a first resistor; the push button switch comprises a first terminal, a second terminal, a third terminal, and a fourth terminal; the first terminal of the push button switch is configured to receive a direct current (DC) voltage; the second terminal of the push button switch is electrically coupled to the control signal input terminal; and the third terminal and the fourth terminal of the push button switch are grounded.

12. The interface switching apparatus of claim 11, wherein the control unit further comprises a first metal-oxide-semiconductor field-effect transistor (MOSFET), a second MOSFET, a second resistor, a third resistor, and a fourth resistor; the switching chip further comprises a first control signal output terminal; the first control signal output terminal is electrically coupled to a gate of the first MOSFET via the second resistor; a source of the first MOSFET is grounded; a drain of the first MOSFET is configured to receive the DC voltage via the third resistor; the drain of the first MOSFET is electrically coupled to a gate of the second MOSFET via the fourth resistor; a source of the second MOSFET is electrically coupled to the first power supply output terminal; and a drain of the second MOSFET is electrically coupled to the second power supply input terminal.

13. The interface switching apparatus of claim 12, wherein the first MOSFET is an n-channel MOSFET; and the second MOSFET is an p-channel MOSFET.

14. The interface switching apparatus of claim 12, wherein the control unit further comprises a third MOSFET, a fourth MOSFET, a fifth resistor, a sixth resistor, a seventh resistor, and a zener diode; the switching chip further comprises a second control signal output terminal; the second control signal output terminal is electrically coupled to a gate of the third MOSFET via the fifth resistor; a source of the third MOSFET is grounded; a drain of the third MOSFET is configured to receive the DC voltage via the sixth resistor; the drain of the third MOSFET is electrically coupled to a gate of the fourth MOSFET via the seventh resistor; a source of the fourth MOSFET is electrically coupled to an anode of the zener diode; a cathode of the zener diode is electrically coupled to the first power supply input terminal; and a drain of the fourth MOSFET is electrically coupled to the second power supply output terminal.

15. The interface switching apparatus of claim 14, wherein the third MOSFET is an n-channel MOSFET; and the fourth MOSFET is an p-channel MOSFET.

16. The interface switching apparatus of claim 14, wherein when the push button switch is not pushed, the second terminal of the push button switch outputs a high voltage level switching signal, the second data pin is switched to communicate with the first data pin by the switching chip, the first control signal output terminal outputs a high voltage level first control signal, the first MOSFET turns on, the second MOSFET turns on, the first power supply output terminal is electrically coupled to the second power supply input terminal, the signal source provides power supply for the electronic device connected with the connector, and the signal source outputs data to the electronic device connected with the connector.

17. The interface switching apparatus of claim 14, wherein hen the push button switch is pushed, the second terminal of the push button switch outputs a low voltage level switching signal, the second data pin is switched to communicate with the third data pin by the switching chip, the second control signal output terminal outputs a high voltage level second control signal, the third MOSFET turns on, the fourth MOSFET turns on, the first power supply input terminal is electrically coupled to the second power supply output terminal, the electronic device connected with the connector provides power supply for the display unit, and the electronic device connected with the connector outputs data to the display unit.

18. The interface switching apparatus of claim 11, wherein the DC voltage is +5 volts; the signal source is a host computer; the display unit is a monitor; and the connector is a high definition multimedia interface (HDMI) connector.

19. An interface switching apparatus comprising:
  a signal source comprising a first power supply output terminal and a data output terminal;
  a display unit comprising a first power supply input terminal and a data input terminal;
  a connector comprising a second power supply input terminal, a second power supply output terminal, and a data input/output terminal;
  a control unit comprising a switch, the switch including:
    a control signal input terminal configured to receive a switching signal;
    a first data pin electrically coupled to the data output terminal;
    a second data pin electrically coupled to the data input/output terminal; and
    a third data pin electrically coupled to the data input terminal;
  wherein the switch is configured to selectively connect the second data pin to the first data pin or the third data pin according to the switching signal;
  wherein when the switch places the second data pin in communication with the first data pin, the signal source provides power for an electronic device connected with the connector through the first power supply output terminal and the second power supply input terminal; and
  wherein when the switch places the second data pin in communication with the third data pin, the electronic device provides power supply for the display unit through the first power supply input terminal and the second power supply output terminal.

* * * * *